(12) United States Patent
Chen et al.

(10) Patent No.: US 9,338,015 B2
(45) Date of Patent: May 10, 2016

(54) REAL TIME POWER MONITOR AND MANAGEMENT SYSTEM

(71) Applicant: Chung Shan Institute of Science and Technology, Armaments Bureau, M.N.D, Taoyuan County (TW)

(72) Inventors: Kun-Feng Chen, Taoyuan County (TW); Chih-Hsien Chung, Taoyuan County (TW); Jung-Zong Wu, Taoyuan County (TW); Kuo-Kuang Jen, Taoyuan County (TW); Yin-Sun Huang, Taoyuan County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 524 days.

(21) Appl. No.: 13/787,736

(22) Filed: Mar. 6, 2013

(65) Prior Publication Data
US 2014/0252854 A1 Sep. 11, 2014

(51) Int. Cl.
*H04L 12/10* (2006.01)
*H04L 12/24* (2006.01)

(52) U.S. Cl.
CPC ............ *H04L 12/10* (2013.01); *H04L 41/0833* (2013.01); *Y04S 40/162* (2013.01); *Y10T 307/406* (2015.04)

(58) Field of Classification Search
CPC .................... H04K 12/10; Y10T 307/406
See application file for complete search history.

(56) References Cited

U.S. PATENT DOCUMENTS

| | | | |
|---|---|---|---|
| 5,602,464 A * | 2/1997 | Linkowsky et al. | 323/272 |
| 5,929,618 A * | 7/1999 | Boylan et al. | 323/282 |
| 6,067,243 A * | 5/2000 | Suzuki et al. | 363/132 |
| 7,000,125 B2 * | 2/2006 | Chapuis et al. | 713/300 |
| 7,102,251 B2 * | 9/2006 | West | 307/64 |
| 7,983,772 B2 * | 7/2011 | Holmes | 700/94 |
| 2004/0245783 A1 * | 12/2004 | Gilbreth et al. | 290/52 |
| 2005/0141248 A1 * | 6/2005 | Mazumder et al. | 363/39 |
| 2012/0265378 A1 * | 10/2012 | Peitzke et al. | 701/19 |
| 2013/0122982 A1 * | 5/2013 | Laor et al. | 463/16 |

FOREIGN PATENT DOCUMENTS

CN 102045207 A * 5/2011 ............. H04L 12/26

\* cited by examiner

*Primary Examiner* — Thienvu Tran
*Assistant Examiner* — Pinping Sun
(74) *Attorney, Agent, or Firm* — Chun-Ming Shih

(57) ABSTRACT

A power monitor and management system includes an automatic modulation device, a monitoring device, multiple modules and an LAN (local area network) connected to the monitoring device and the modules to enable the monitoring device to communicate with the modules. The automatic modulation device determines a dominating module in accordance to registration sequences of the modules and subordinating modules and to modulate power of the dominating module and the subordinating modules as well as the overall power output in accordance with number of the modules.

5 Claims, 5 Drawing Sheets

REAL TIME POWER MONITOR AND MANAGEMENT SYSTEM

BACKGROUND OF THE INVENTION

1. Field of the Invention

This invention is related to a real-time power monitor and management system, and more particular, to a monitor and management system focusing on power modulation among multiple converters so that a total power output can be successfully adjusted in accordance with variant loads.

2. Description of Related Art

Conventionally, parallel control to a bidirectional series parallel frequency converter uses such as unbalanced power calculation and circulation current limitation to correct the output of the frequency converter to ensure steady power supply from parallel uninterrupted power systems; UPS, in which a phase locking request may be completed by a chosen one of the UPS modules sending a synchronous clock signal for reference by other subordinate UPS modules such that all the reference voltage and phase of the UPS modules remain the same. Because the synchronous clock signal is generated inside the system, the pulse width modulation; PWM, of the system switch may be made synchronous. Thus the asynchronous impact to the circulation current from the power switch is reduced to the minimum.

Based on the current commercially available real-time monitoring and management system, loading of the power grid system is constantly changing. Because each frequency converter in every module is parallel to one another, it can only modulate the system overall output power and cannot individually modulate the output power of each module. As a result, the flexibility of the power grid modulation is reduced, which is also inferior to the power adjustment. To overcome the problem, one solution is to add in more parallel modules to the power grid to elevate the capacity, however, the connection as well as the power modulation becomes complex and complicated.

As a result, providing a real-time monitor and management system to effectively modulate the output power and synchronize the signal as well as phase between a dominating module and a subordinating module becomes an objective of the present invention.

SUMMARY OF THE INVENTION

The primary objective of the present invention is to provide a real-time monitor and management system having a dominating module to send out a synchronous clock signal and subordinating modules to receive the synchronous clock signal so as to synchronize phase of the reference voltage and the synchronous clock of the subordinating modules with the dominating module to successfully proceed with parallel operation.

Another objective of the present invention is to provide a real-time monitor and management system to protect multiple paralleled bidirectional frequency converters and complete power modulation among converters. The system enables the monitor end to smoothly modulate the overall power output.

Still another objective of the present invention is to provide a real-time monitor and management system to modulate overall output power modulation in accordance with variant loads.

In order to accomplish the aforementioned objectives, the preferred embodiment of the present invention provides a real-time monitor and management system having an automatic modulation device and a monitoring device, multiple modules and an LAN (local area network) connected to the monitoring device and the modules to enable the monitoring device to communicate with the modules. The automatic modulation device determines a dominating module in according to registration sequences of the modules and subordinating modules and to modulate the power of the dominating module and the subordinating modules as well as the overall power output in accordance with number of the modules.

BRIEF DESCRIPTION OF THE DRAWINGS

The invention, as well as its many advantages, may be further understood by the following detailed description and accompanying drawings.

DETAILED DESCRIPTION OF THE INVENTION

Figure 1:
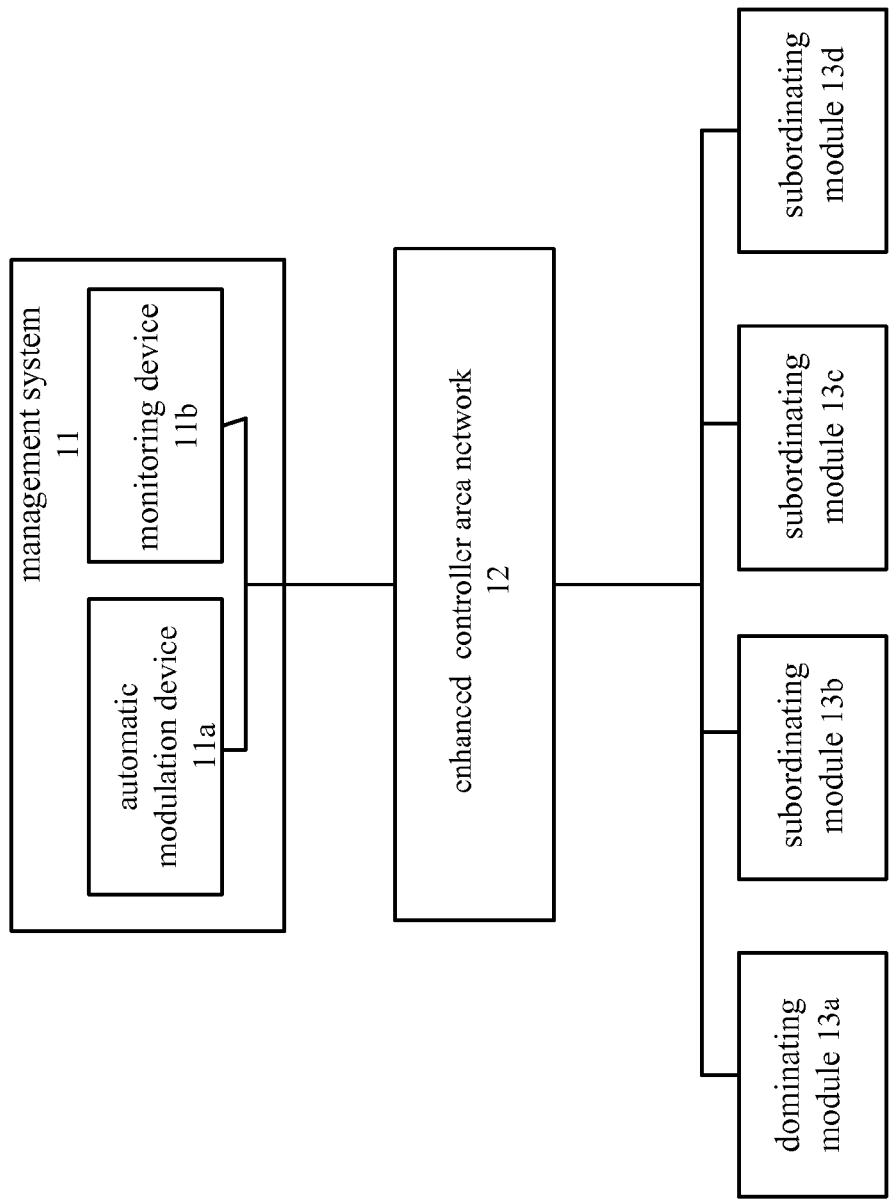
FIG. 1 is a schematic diagram showing elements used in the preferred embodiment of the present invention.

With reference to FIG. 1, the real-time monitor and management equipment constructed in accordance with the present invention is shown and has a monitor and management system 11 composed of an automatic modulation device 11a, a monitoring device 11b, a LAN (local area network) 12 and modules 13.

The LAN 12 is connected to the system 11 and the modules 13 to allow the system 11 to communicate with the modules 13. The automatic modulation device 11a determines a dominating module 13a in according to registration sequence of the modules 13 and subordinating modules, such as 13b, 13c and 13d in the embodiment. The automatic modulation device 11a modulates the power of the dominating module 13a and the subordinating modules 13b, 13c and 13d and adjust an overall output power in accordance with number of the modules 13.

In addition, the monitoring device 11b sends out a command via the LAN 12 to synchronize clock signals of the dominating module 13a and the subordinating modules 13b, 13c and 13d. Above all, the LAN 12 is an enhanced controller area network; eCAN BUS to receive and decode the command from the monitoring device 11b. The decoded command is then sent to the modules 13 to enable the modules to operate in response to the decoded command. Further, the LAN 12 is able to send an execution command to the monitoring device 11b to update the monitoring device 11b.

Figure 2:
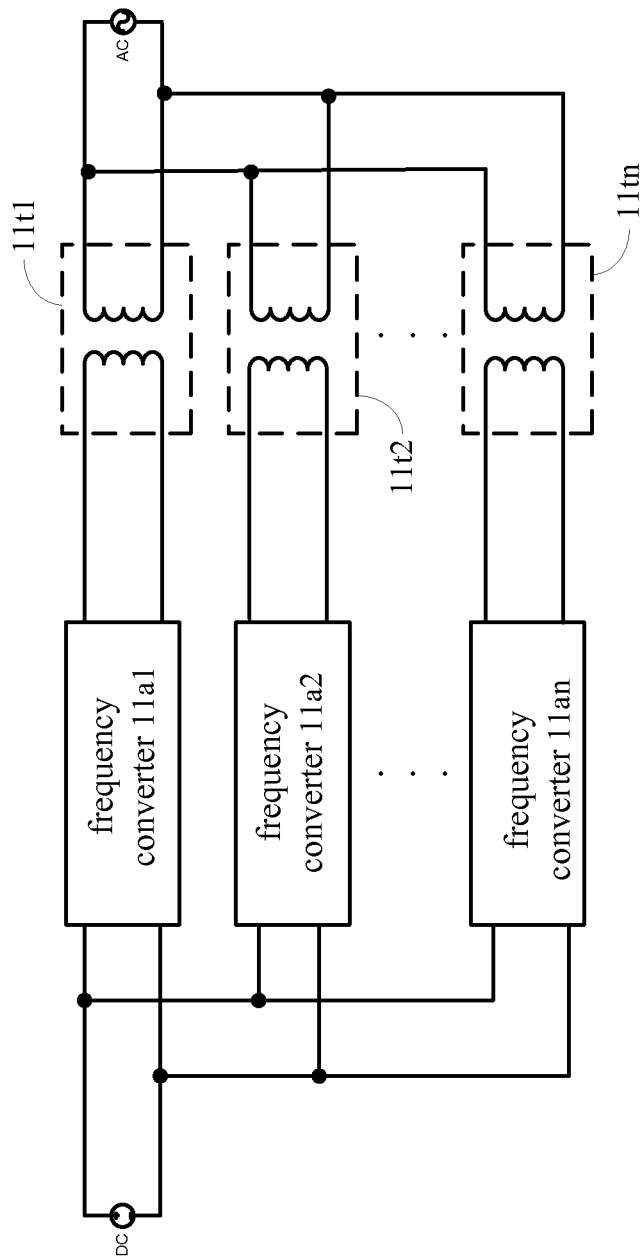
FIG. 2 a schematic diagram showing a paralleled bidirectional frequency converter in the automatic modulation device of the preferred embodiment of the present invention.
Figure 3:
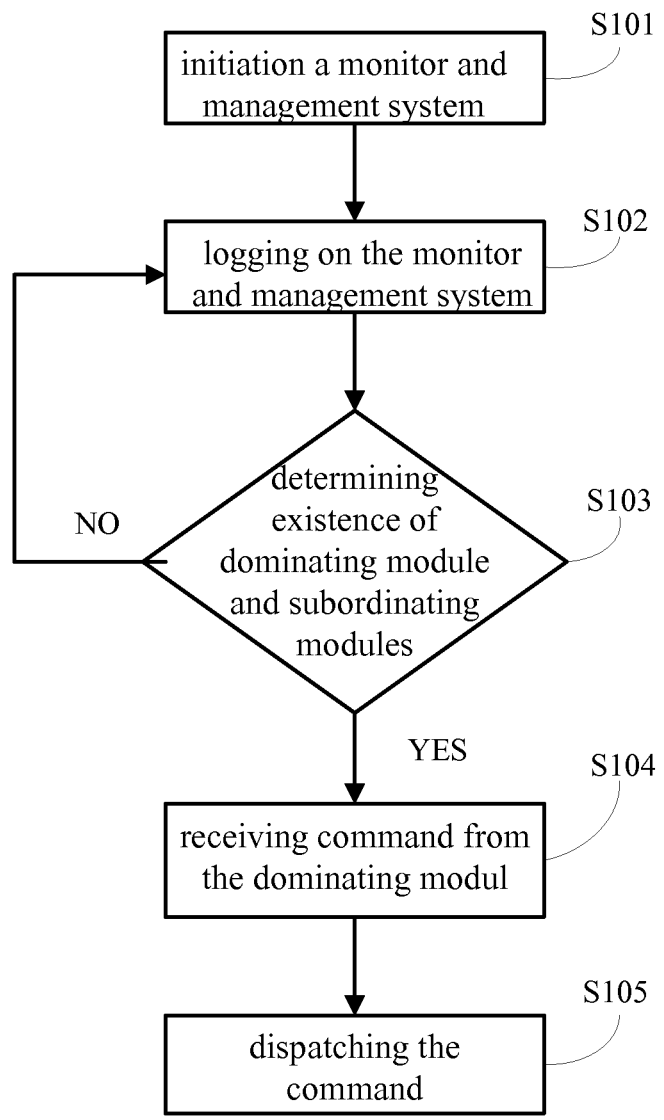
FIG. 3 is a logic flow of the management method used in the system of the preferred embodiment of the present invention.

With reference to FIG. 2, it is noted that the automatic modulation device 11a includes multiple frequency converters 11a1, 11a2 ... 11an and multiple transformers 11t1, 11t2 ... 11tn. The frequency converters 11a1, 11a2 ... 11an are electrically connected to a first power supply and a side of each of the frequency converters 11a1, 11a2 ... 11an is connected to the transformers 11t1, 11t2 ... 11tn whose one side is connected to a second power supply, wherein the first power supply is a DC power supply and he second power supply is an AC power supply. Due to the provision of the eCAN BUS to transfer command to modulate the output power and the dominating module as well as the subordinating modules is determined according to the registration sequence of the modules, as shown in FIG. 3, the method used in the preferred embodiment of the present invention includes the steps of:

S101: initiation a monitor and management system;

S102: logging on the monitor and management system (registration);

S103: determining existence of dominating module and subordinating modules;

S104: receiving command from the dominating module; and

S105: dispatching the command.

Figure 4:
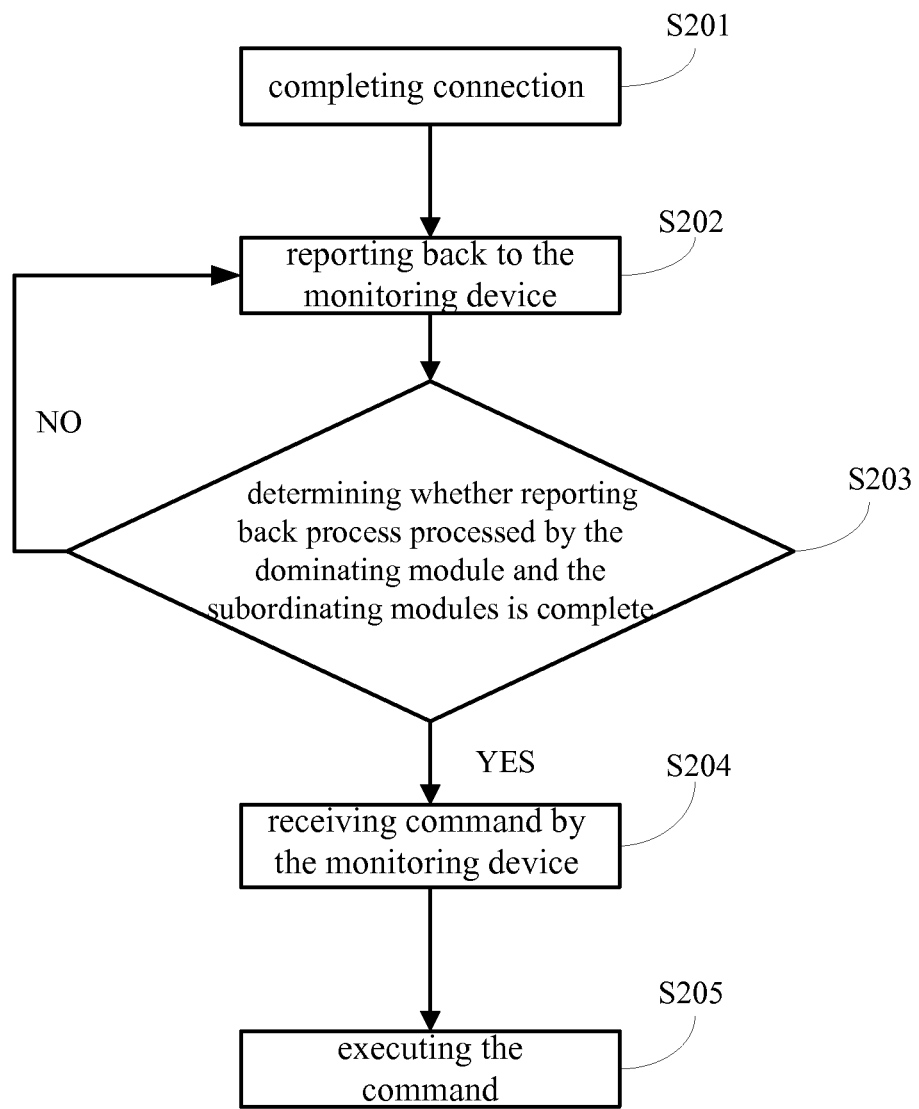
FIG. 4 is a logic flow of the monitoring method used in the system of the preferred embodiment of the present invention.

After registration process is completed, load variation and power output is monitored by the dominating module and the monitor result is regularly reported back to the monitoring device 11b to modulate power output between the dominating module and the subordinating modules in real-time. As shown in FIG. 4, the monitoring method used in the preferred embodiment of the present invention includes the steps of:

S201: completing connection;

S202: reporting back to the monitoring device;

S203: determining whether reporting back process processed by the dominating module and the subordinating modules is completed;

S204: receiving command by the monitoring device; and

S205: executing the command.

Figure 5:
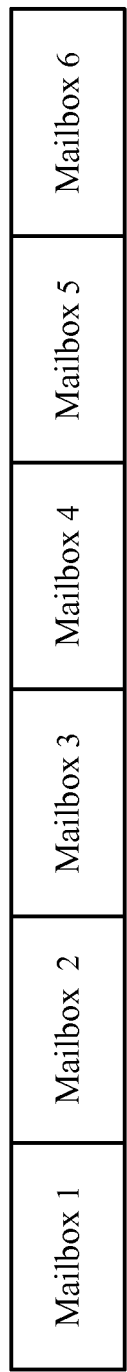
FIG. 5 is a schematic view showing mailboxes determined in according to various functions in the commands.

According to structure and function variations of the command, mailboxes, as shown in FIG. 5, are defined in the following:

Mailbox 1: registration sequence of the dominating module and the subordinating modules, wherein an initial station number is "0" defined as the monitoring device, the station number for the dominating module is "1" and the starting station number for the subordinating module is "2" and the followings.

Mailbox 2: status code respectively defining 16 different statuses, i.e., 10h: electricity selling notice; 11h: electricity buying notice; 12h: waiting for receiving command; 13h: during modulation in according to command; 14h: completing modulation according to the command; 15h: malfunction and requesting for withdraw; 16h: standby for enter; 17h: synchronous reporting back to the monitoring device; 18h: asynchronous reporting back to the monitoring device; 19h: compulsory electricity selling abort; 1Ah: compulsory electricity buying abort; 1Bh: altering communicating interface; 1Ch: passive information supply; 1Dh: subjective information supply; 1Eh: operation abort and 1Fh: changing the dominating module to the subordinating module and vice versa.

Mailbox 3: system power indication;

Mailbox 4: system voltage indication;

Mailbox 5: system current indication;

Mailbox 6: outlet voltage indication.

Furthermore, multiple communication structures and commands for bidirectional frequency converters may be formed to facilitate the real-time power modulation of the system. It is noted that the system of the preferred embodiment is able to protect multiple bidirectional frequency converters and complete the power modulation among the bidirectional frequency converters. As a result, the overall power output may also be modulated.

The automatic modulation device of the monitor and management system of the preferred embodiment of the present invention uses eCAN BUS as the communication interface and specifically designates the dominating module and the subordinating modules according to the registration sequence such that command from the dominating module is sent to the subordinating modules via the eCAN BUS. Then the dominating module as well as the subordinating modules is able to be modulated simultaneously. Meanwhile, the output power of the subordinating modules maybe modulated according to number of so registered.

It is to be noted the increased paralleled frequency converters connected to the LAN receive commands according to the communication structure and format from the monitoring device 11b and execute the decoded commands. Thereafter, the monitoring device 11b is updated constantly. As a result, the system of the preferred embodiment of the present invention satisfies the phase locking request in the conventional uninterrupted power supply, UPS. That is, a dominating module 13a is generated from the modules 13 to send out a command, a synchronous clock signal. After the dominating module 13a is designated, other modules are becoming the subordinating modules 13b, 13c and 13d. After receiving the command from the dominating module 13a, reference voltage and synchronous signal of the subordinating modules 13b, 13c and 13d become the same as those of the dominating module 13a. Thus, the subsequent operation is functional.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A power monitor and management system comprising:
an automatic modulation device including multiple frequency converters electrically connected multiple transformers, respectively, a first power supply connected to the frequency converters and a second power supply connected to the transformers;
a monitoring device;
multiple USP (uninterrupted power system) modules; and
an eCAN BUS (enhanced controller area network) connected to the monitoring device and the UPS modules to enable the monitoring device to communicate with the UPS modules, wherein the automatic modulation device determines a dominating module of the UPS modules according to registration sequences of the UPS modules logging on the power monitor and management system and other UPS modules becoming subordinating modules, and adjusts an overall power output in accordance with a number of the UPS modules, and
wherein load variation and power output are monitored by the dominating module and a monitor result is regularly reported back to the monitoring device to modulate power output between the dominating module and the subordinating modules in real-time.

2. The system as claimed in claim 1, wherein the monitoring device sends out a command to synchronize a clock signal between the dominating module and the subordinating modules.

3. The system as claimed in claim 2, wherein the eCAN bus receives a command and sends out decode command to the modules to enable the modules to operate according to the decoded command.

4. The system as claimed in claim 3, wherein the eCAN bus sends out an executable command to update the monitoring device.

5. The system as claimed in claim 1, wherein the first power supply is a DC power supply and the second power supply is an AC power supply.

\* \* \* \* \*